(12) United States Patent
Graham et al.

(10) Patent No.: US 10,333,991 B2
(45) Date of Patent: Jun. 25, 2019

(54) WEB BROWSER POLICY FOR HTTP-BASED APPLICATION

(71) Applicant: HEWLETT-PACKARD DEVELOPMENT COMPANY, L.P., Houston, TX (US)

(72) Inventors: Christoph J Graham, Houston, TX (US); Yongmei Hua, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 160 days.

(21) Appl. No.: 15/320,475

(22) PCT Filed: Jul. 9, 2014

(86) PCT No.: PCT/US2014/045970
§ 371 (c)(1),
(2) Date: Dec. 20, 2016

(87) PCT Pub. No.: WO2016/007154
PCT Pub. Date: Jan. 14, 2016

(65) Prior Publication Data
US 2017/0163690 A1     Jun. 8, 2017

(51) Int. Cl.
*H04L 29/06*     (2006.01)
*G06F 17/22*     (2006.01)
(Continued)

(52) U.S. Cl.
CPC .......... *H04L 63/205* (2013.01); *G06F 16/958* (2019.01); *G06F 17/2247* (2013.01);
(Continued)

(58) Field of Classification Search
CPC ............ G06F 17/2247; G06F 17/3089; G06F 21/554; G06F 21/604; G06F 21/62; H04L 63/10
(Continued)

(56) References Cited

U.S. PATENT DOCUMENTS

| 7,207,003 B1 * | 4/2007 | Berstis | G06F 17/30905 |
| | | | 707/E17.121 |
| 7,792,828 B2 * | 9/2010 | Roegner | G06Q 30/02 |
| | | | 707/723 |

(Continued)

FOREIGN PATENT DOCUMENTS

| CN | 1398377 | 2/2003 |
| CN | 101425072 | 5/2009 |

(Continued)

*Primary Examiner* — Meng Li
(74) *Attorney, Agent, or Firm* — HPI Patent Department (57) ABSTRACT

In one example, a method for enforcing, using a web browser of a client, a predefined management policy for an HTTP-based application executed on a server. The method includes initializing the browser with the policy, the policy including at least one operation and an element, associated with that operation, of a document object model (DOM) for a web page presented to the client by the application. The method also includes detecting with the browser a document change event for an element of the DOM. The method further includes performing the operation if the document change event is for an element in the policy.

13 Claims, 6 Drawing Sheets

(51) Int. Cl.
*G06F 16/958* (2019.01)
*G06F 21/55* (2013.01)
*G06F 21/60* (2013.01)
*G06F 21/62* (2013.01)

(52) U.S. Cl.
CPC .......... *G06F 21/554* (2013.01); *G06F 21/604* (2013.01); *G06F 21/62* (2013.01); *H04L 63/10* (2013.01); *H04L 63/20* (2013.01)

(58) Field of Classification Search
USPC .......................................................... 713/1
See application file for complete search history.

(56) References Cited

U.S. PATENT DOCUMENTS

| | | | |
|---|---|---|---|
| 8,347,349 B1 | 1/2013 | Wilson et al. | |
| 8,555,365 B2 | 10/2013 | Shi | |
| 8,689,278 B2 | 4/2014 | Mihara et al. | |
| 9,349,007 B2* | 5/2016 | Born | G06F 21/566 |
| 9,979,726 B2* | 5/2018 | Freitas Fortuna dos Santos | H04L 63/1466 |
| 2007/0226613 A1 | 9/2007 | Tandriono et al. | |
| 2008/0313257 A1* | 12/2008 | Allen | G06F 9/44505 709/201 |
| 2009/0070466 A1 | 3/2009 | Elbring | |
| 2009/0138937 A1 | 5/2009 | Erlingsson et al. | |
| 2009/0282333 A1 | 11/2009 | Olsen et al. | |
| 2011/0015917 A1 | 1/2011 | Wang et al. | |
| 2011/0320880 A1 | 12/2011 | Wenig et al. | |
| 2012/0131469 A1* | 5/2012 | Yamuna | G06F 9/54 715/736 |
| 2013/0086627 A1* | 4/2013 | Bryan | H04L 63/10 726/1 |
| 2013/0138733 A1 | 5/2013 | Heinrich et al. | |
| 2014/0053234 A1 | 2/2014 | Barton et al. | |

FOREIGN PATENT DOCUMENTS

| | | |
|---|---|---|
| CN | 103135956 | 6/2013 |
| TW | 200729031 A | 8/2007 |

* cited by examiner

WEB BROWSER POLICY FOR HTTP-BASED APPLICATION

BACKGROUND

Many web sites that can be browsed by a user of a web browser of a client computer via hypertext transfer protocol (HTTP) or secure hypertext transport protocol (HTTPS) are web-based applications hosted on a server computer. These applications expose their user interface via the web browser and have no installation on the client computer. The applications rely on the application server, not the client, to implement the features of the application and to manage access to the data on the server before it is transmitted to the client. Once the features have been exposed, and the data transmitted, to the client over the connection, the client has no access points to control either the features or the data. The same occurs for data input by a user at the client. The user can access all the exposed features of the application, and all the data, even if an administrator of the client computer desires to limit or restrict access to certain of these features and data.

DETAILED DESCRIPTION

A substantial increase in the deployment of web-based applications (also referred to as "apps") has created significant obstacles for the management of application-level policies such as, for example, those concerned with preventing leakage of sensitive data. A web-based application (also referred to as a "browser-based" or "hosted" application) is resident on, and executed by, one or more server computers on the world wide web responsive to inputs provided from a client computer communicatively coupled over the web to the application. An application may be resident on and hosted by a single server computer, or portions may be split or shared among multiple websites/webpages hosted on different servers, such as for example a business directory app that includes in its content a map embedded from another app. Web-based applications expose their user interface via a web browser client and have no installation on the user's client computer. The client computer couples to the application by directing the web browser to the uniform resource locator (URL) for the application; examples include facebook.com, linkedin.com, salesforce.com, and numerous others. In such applications, business logic is run at the server, not at the client. The applications rely on the application server, not the client, to apply policy-controlled access to data before the data is transmitted to the client. Web-based applications may provide access control points to their data and/or functions through an identity management scheme. This type of access can be based on user, role, location, access device, and/or network connectivity. However, this scheme controls data flow and function access from the application server, not from the client. Once the function is made accessible to, and/or the data is sent to, the client over the HTTP/HTTPS connection, the client has no control points to enforce management policies intended to ensure that the data or functions are not accessed or operated inappropriately, in a manner contrary to these policies.

One core concept of the present disclosure is to provide a mechanism and a framework for enforcing, using a web browser of a client, predefined management policies for a web-based application executed on a server. These policies may include, in one example, specifying how data can be printed, manipulated, stored, or copied to other applications on the client. The policies may alternatively or additionally include, in one example, specifying whether, when, and/or how a function or feature of the application may be interacted with by a user on the client. When implemented with a computer, the result is a significant enhancement to the computer's function, enabling the predefined management policies to be enforced on a client in its interactions with such web-based applications in advantageous and beneficial ways.

Referring now to the drawings, there are illustrated examples of a system, client computer, method, and computer-readable storage medium which perform predefined operations on the client computer in response to the occurrence of predefined events associated with the web-based application to implement and enforce predefined management policies.

Figure 1:
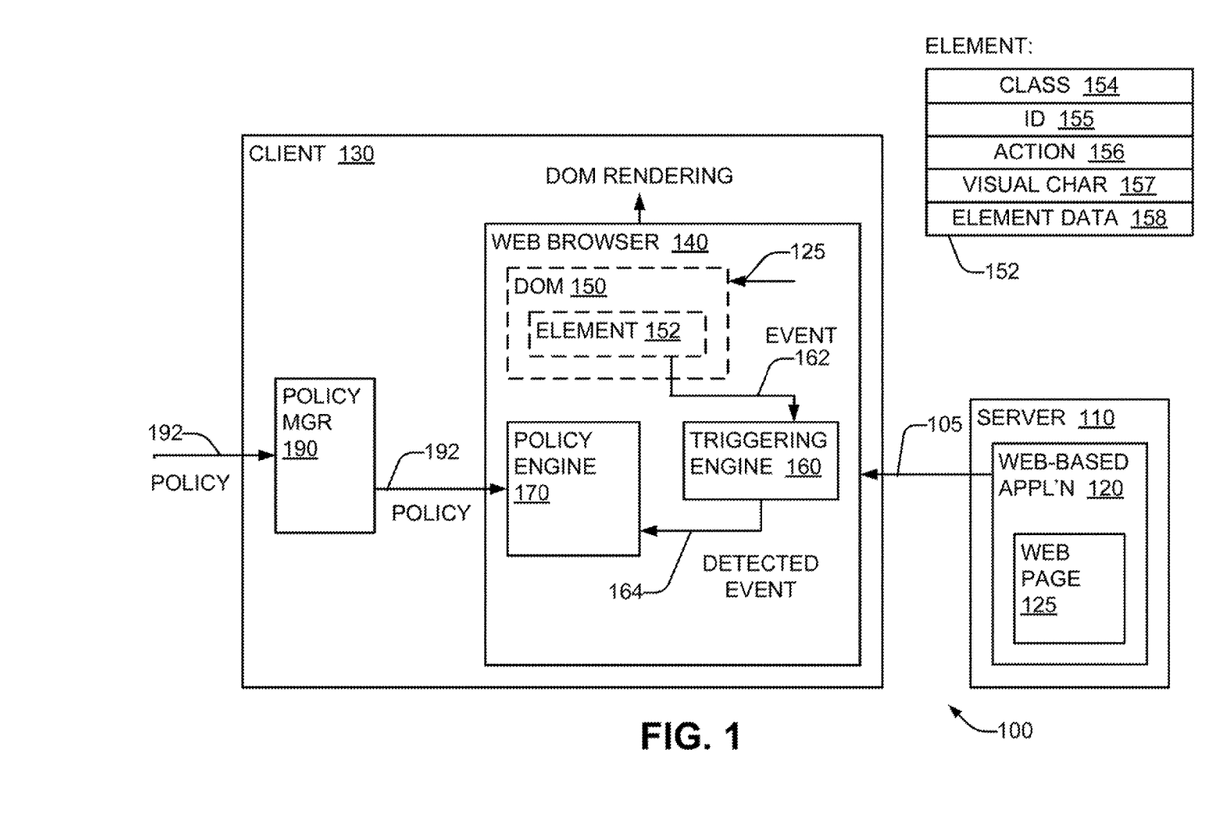
FIG. 1 is a schematic block diagram of a system including a client computer having a web browser with a policy control feature in accordance with an example of the present disclosure.

Considering now such a system, and with reference to FIG. 1, a system 100 includes a server computer 110 communicatively coupled to a client computer 130 via a communications link 105. The server 110 hosts and executes a web-based application 120. In some examples, the web-based application 120 is an HTTP-based application. As defined herein and in the appended claims, an "HTTP-based application" may be broadly understood to encompass a web-based application in which the communications between the server executing the application and a client accessing the application are carried out by hypertext transfer protocol (HTTP) or hypertext transfer protocol secure (HTTPS). The application 120 generates at least one web page 125, which is transmitted over the link 105 to the client 130. The web page 125 is a document of elements or objects pf a markup language, such as HTML (hypertext markup language), XHTML (extensible hypertext markup language), and/or XML (extensible markup language). Different web pages, or different content of a particular web page, may be transmitted from the server 110 to the client 130 from time to time as modified by the execution of the application, or in response to interactions by a user of the client 130 with the application 120.

The client 130 includes a web browser 140 that receives the web page 125. The received web page is stored in the browser 140 as a document object model 150 of the web page 125. As defined herein and in the appended claims, a "document object model" (or "DOM") may be broadly understood to mean a convention for representing and interacting with objects of HTML, XHTML, and XML documents, such as web pages. The web browser 140 renders the DOM 150 for the received web page for viewing and interaction by a user of the client 130.

The web browser 140 includes a triggering engine 160 to detect a change event 162 for an element 152 of the DOM 150. As defined herein and in the appended claims, a "DOM element" may be broadly understood to mean an element of an HTML or XHTML document, such as a web page, or a node of an XML document, that is represented according to the DOM model. Also as defined herein and in the appended claims, a "change event" (or "document change event") for a DOM element may be broadly understood to mean a change to the presence of the element, a change to a property or attribute of the element, or a change to a data value of the element. A change to the element presence includes the element being added to, or removed from, the DOM. A change to a property, attribute, or data value of the element changes an aspect of an existing element. A document load event may be one of a number of different types of events detected by the triggering engine 160.

Properties of a DOM element 152 may include one or more visual characteristics 157 defining how the element is to be rendered by the web browser 140; in one example, there may be visual properties for font-size, color, background appearance, and so on. Attributes of a DOM element 152 may include one or more tags (or properties) that each define a characteristic of an element. Such tags may include, among others, a class tag 154 that identifies the type of the element; an ID tag 155 that may assist in locating an element; and an action tag 156 that specifies an action to be taken by the web browser 140 in response to the element being selected. Selection may occur in a variety of ways, including but not limited to changing focus to, mousing over, clicking on, right-clicking on, or touching. A data value 158 of an element may be, in one example, a text string or numeric value for the element.

As defined herein and in the appended claims, "modifying" a DOM element may be broadly understood to mean changing at least one of the element's presence, properties, attributes, and/or data value.

The web browser 140 also includes a policy engine 170. As defined herein and in the appended claims, a "policy engine" (or "policy control hook") may be broadly understood to mean a mechanism on a client computer for enforcing a predefined policy during interactions with a web-based application. The policy engine 170 is executed within the context of the web browser 140. The policy engine 170 is coupled to the triggering engine 160, and responds to a detection signal 164 from the triggering engine 160 for the event 162. The detection signal 164 identifies the DOM element that is associated with the change event 162, and describes the change event 162. The policy engine 170, in response to the detection signal 164, performs any predefined policy that may exist for the DOM element associated with the change event 162. In one example, if the detection signal 164 is for the event 162 associated with the DOM element 152, the operation specified in any policy that exists for DOM element 152 will be performed by the policy engine 170. A wide range of operations may be specified in a policy, including modifications to one or more elements of the DOM (which may or may not include the DOM element 152 for which the change event 162 occurred), as well as actions performed at least partially outside of the web browser 140, such as logging information related to the event, or controlling copying, printing, or saving of data related to the application 120 outside of the web browser 140. The operations performed by the policy engine 170 are different from, and independent of, the rendering of the DOM by the browser 140. In different examples, the operations performed by the policy engine may be either asynchronous from, or synchronized with, the rendering of the DOM. It is noted that the policy engine 170 is not a script (e.g. a javascript), and is not part of the web page.

The client computer 130 further includes a policy manager 190. The policy manager 190 receives a predefined policy 192 that specifies an operation, other than rendering the DOM 150, that is associated with a change event 162 and a DOM element 152. As defined herein and in the appended claims, a "policy" may be broadly understood to include a data structure usable to implement a limitation, enforced at the client computer, on the access or usage of a function or data of a web-based application. The policy manager 190, in turns provides the policy 192 to the policy engine 170, and the engine 170 may be initialized or configured with the policy 192. Plural policies 192 may be grouped together into a policy dataset.

The server 110 and the application 120 may be unaware of the policy 192, and of the operation performed by the policy engine 170. As such, a given application 120 can be interacted with by multiple browsers 140 on multiple clients 130 that each implement different policies 192. In addition, access to functions and data of the application 120 may be restricted by a policy 192 without breaking the application 120. In other words, unrestricted functions and data of the application 120 will continue to operate normally on the client 130.

In some examples, the client computer may be a thin client. As defined herein and in the appended claims, a "thin client" may be broadly understood to include a client computer which has a predefined set of application programs and to which application programs cannot be added or removed. In a thin client, a user cannot install a different web browser application in order to bypass the web browser 140 and the policy engine 170 and access the application 120 without the restrictions enforced by the policy.

Figure 2:
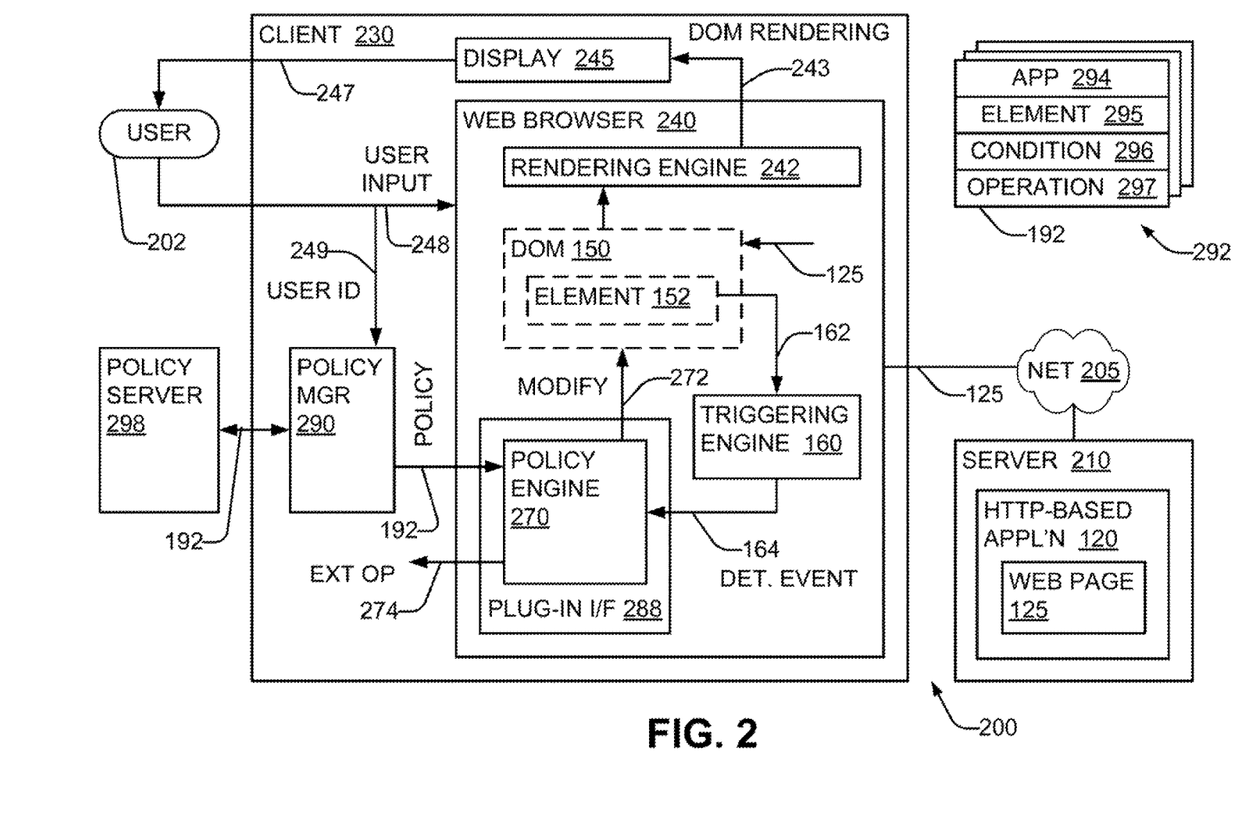
FIG. 2 is another schematic block diagram of a system including a client computer having a web browser with a policy control feature in accordance with an example of the present disclosure.

Considering now another system including a client computer having a web browser with a policy control feature, and with reference to FIG. 2, a system 200 includes a server computer 210 communicatively coupled to a client computer 230 via a network 205. In one example, the network 205 is the Internet. In other examples, the network 205 may be different from the Internet. The server 210 is similar to server 110 (FIG. 1).

The client 230 includes a web browser 240. A rendering engine 242 of the browser 240 accesses the DOM 150 and generates rendered output 243 to a display 245 where it is viewable by a user 202 in visual form 247 as a graphical user interface (GUI). The user 202 interacts with the client computer 230 through the GUI to supply user input 248 to the browser 240. Examples of user input 248 include the user selecting a DOM element, selecting one of a set of multiple page views (e.g. page tabs), changing the position or orientation of a DOM element, and entering data into a text box, among many others.

During operation of the application 120, changes may be made to one or more DOM elements, such as element 152 in one example. These changes may occur in response to user input 248, or independently of it. The application 120 may update or replace the web page 125 to reflect the changes, and send to the client 230 the updates or the new page. The rendering engine 242 operates to visually render the DOM 150 of the revised page. The triggering engine 160 also operates on the revised DOM 150 to detect changes to its elements, such as change event 162 for element 152, and sends the detected event signal 164 to the policy engine 270.

The policy engine 270 operates similarly to policy engine 170 (FIG. 1). In executing a predefined policy, if one exists, for the DOM element associated with the change event 162 (and the detected event 164), the policy engine 270 may modify 272 one or more elements of the DOM 150. The policy engine 270 may also communicate an external operation 274 outside of the browser 240, such as to the operating system (not shown), or another module, of client 230. Examples of such external operations 274, as discussed subsequently include logging information related to the event to a file for subsequent operations such as auditing, or allowing or disallowing the copying, printing, or saving of data related to the application 120 outside of the web browser 140. In some examples, multiple external operations may be combined; for instance, logging may be combined with either allowing or disallowing the logged operation.

In some examples, such as in FIG. 2, the web browser 240 includes a plug-in interface 288 that gives software modules which are not integral to the browser 240 access to functions and data structures of the browser 240. In these examples, the policy engine 270 may be implemented as a browser plug-in module that mates with the plug-in interface 288. This architecture allows the policy engine 270 to be implemented as a separate module that can be added-on to the browser 240, but which can interoperate with it in a tightly integrated manner.

The policy manager 290 operates similarly to the policy manager 190 (FIG. 1). The policy manager 290 may be a software module of the client 230 external to the web browser 240. In some examples, the policy manager 290 obtains the policy 192 (often as part of a dataset having multiple policies 192) from an external policy server 298, and configures the policy engine 270 with the obtained policy 192. In other examples, the policy manager 290 may cache previously retrieved policies 192 in the client 230, and supply a cached policy 192 to the policy engine 270. Cached policies may be used, in one example, at times when the policy server 298 is not accessible. The policy manager 190 may receive a user ID 249 from the user 202, or similar identifying information from the user 202 or from the client 230. The policy manager 190 may then use this information to identify and obtain those policies, from the policy server 298 or in the cache, which are associated with the user 202 and/or the client 230. In this manner, the policy engine 270 can be configured with the proper policies that are applicable to the user 202 and/or the client 230. In a different example, all the policies may be applicable to all the users 202 and/or clients 230, and the user ID 249 may not be provided or used.

Considering the policy 192 in greater detail, a plurality of policies 192 may be used by the policy engine 270 in conjunction with a particular application 120. These plural policies 192 may form a policy dataset 292. Each policy 192 is predefined, often by an IT administrator or similar personnel, to implement management policies for a group of clients 230, such as those belonging to a particular organization. Each policy 192 includes various fields.

An application field 294 specifies the application 120 to which the policy 192 applies. This allows the policy engine 270 to be configured with policies 192 for multiple applications 120 at the same time, so that the proper ones can be applied as the user surfs from one application 120 to a different application 120. In some examples, multiple applications 120 may be specified in the application field 294. In some examples, if the application field 294 does not contain an entry, the policy engine 270 applies the policy 192 to all applications 120.

An element field 295 specifies the DOM element 152 to which the policy 192 applies. In one example, the DOM element 152 may be identified by the class tag 154 of the DOM element 152.

A condition field 296 specifies the condition that, if satisfied, causes the operation specified by an operation field 297 to be performed by the policy engine 270. The condition may be for the DOM element 152 as a whole, or for the element data 158 of the element 152. Examples of conditions that are applicable to an element 152 as a whole include whether the element is visible, or whether the element has been selected by the user. Examples of conditions that are applicable to element data 158 include whether a particular substring of characters are present in element textual data, or whether the value of element numerical data is outside a specified value range. In some examples, the condition field 296 may include a plurality of conditions connected by logical operators (e.g. AND, OR, NOT, etc.) which are evaluated to determine whether the condition is satisfied. The policy engine 270 may make a combined assertion or truth statement based on these conditions. For example: IF condition 1 exists OR condition 2 exists. THEN perform operation 3.

An operation field 297 specifies the operation that is to be performed by the policy engine 270, for the application 120 specified in the application field 294, when the condition specified in the condition field 196 for the element specified in the element field 295 is satisfied. As has been mentioned heretofore, in some examples the operation may modify at least one element 152 of the DOM 150. In such cases, the operation field 297 specifies both the operation to be performed, and the element 152 on which the operation is performed. The element 152 may be the same element specified in the element field 295 or a different element 152 of the DOM 150. In some examples, the operation field 297 may specify that the operation is to be performed on multiple elements. In some examples, the operation field 297 may specify multiple operations, and each of these multiple operations may be performed on one or more elements. Examples of operations that modify a DOM element 152 include removing a specified element from the DOM 150, adding an element to the DOM 150, changing an attribute or property of a DOM element, or changing the contents of element data.

In other examples, the operation may be a request to a program or module external to the browser 240 to perform a particular task. As mentioned heretofore, this may include logging data related to the change event to a file. In such cases, the policy engine 270 may provide the data to be logged along with the request. The policy manager 190 may receive these requests and data, and either perform the operation itself, or route it to the appropriate resource of the client 130.

Figure 3:
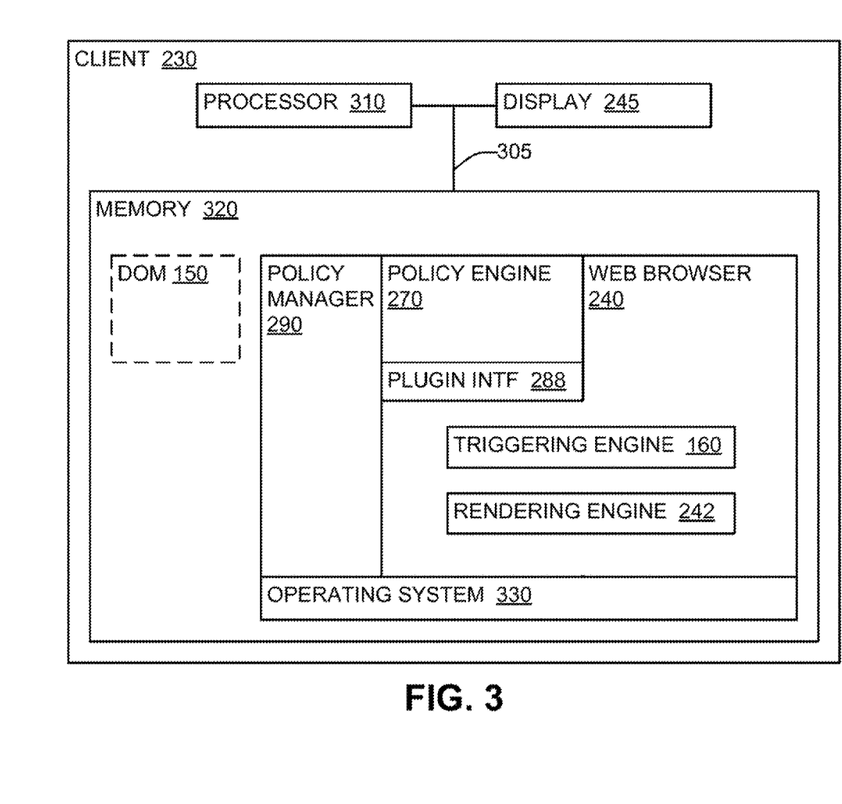
FIG. 3 is a schematic block diagram of an architecture of the client computer of FIG. 2 in accordance with an example of the present disclosure.

Considering now in greater detail one example architecture of the client computer 230, and with reference to FIG.

3, the client computer 230 includes a processor 310 and a memory 320. The processor 310 is communicatively coupled to the memory 320 and to the display 245 via link 305. In some examples, such as that illustrated in FIG. 3, the memory 320 and the display 245 are also coupled via link 305, although in other examples they may not be directly coupled to each other.

Programs executable by the processor 310, in addition to data such as the DOM 150, may be stored in the memory 320. The programs, having individual instructions executable by the processor 310, may be conceptually organized in a hierarchy. An operating system 330 that has access to the hardware resources of the client computer 230 is at the lowest level. Native programs, including the web browser 240, the policy manager 290, and other programs (not shown) are at a next higher level in the hierarchy, and can directly access the functions of the operating system. The policy engine 270 is at a still higher level in the hierarchy, since it plugs into the web browser 240 via the plug-in interface 288. As such, the policy engine 270 executes within the context of the web browser 240. Program instructions may install the policy engine 270 into the web browser 240 via the plug-in interface 288. The policy engine 270 does not have direct access to the functions of the operating system, but instead has access to those functions of the web browser 240 which are exposed to it by the plug-in interface 270. In order to perform operations that are not exposed, such as data logging and access to other functions of the client 230, the policy engine 270 may send the requests for such operations to the policy manager 290.

Figure 4:
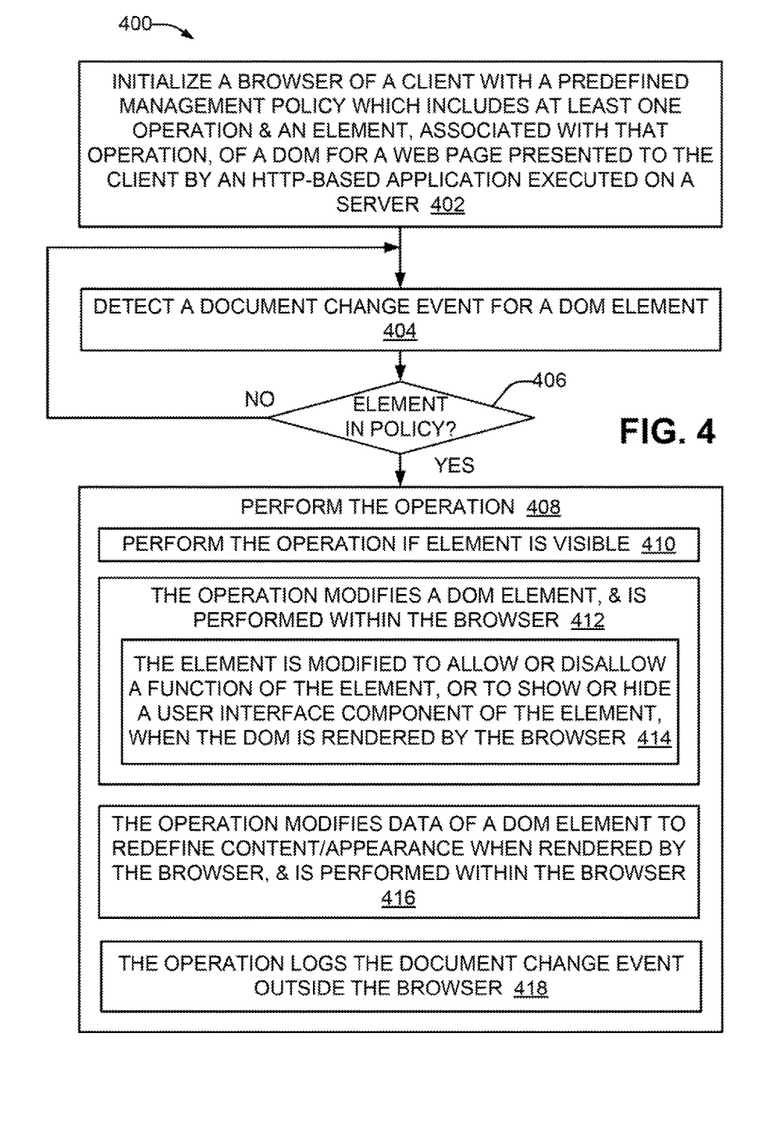
FIG. 4 is a flowchart of a method for enforcing, using a web browser of a client computer, a predefined management policy for an HTTP-based application executed on a server computer, in accordance with an example of the present disclosure.

Consider now, and with reference to FIG. 4, a method for enforcing, using a web browser of a client computer, a predefined management policy for an HTTP-based application executed on a server computer. Alternatively, FIG. 4 may be considered a flowchart of the web browser of the client computer. As noted above, references to HTTP may include HTTPS and other compatible protocols. The method begins, at 402, by initializing the browser with the policy. The policy includes at least one operation. For each operation, the policy also includes an associated element of a document object model (DOM) for a web page presented to the client by the application. At 404, a document change event for an element of the DOM is detected by the browser. At 406, the document change event is examined to determine whether the event is for an element in the policy. If not ("No" branch of 406), the method branches back to 404. If so ("Yes" branch of 406), then at 408 the operation of the policy is performed. In some examples, at 410, the operation is performed if the element is visible. In some examples, at 412, the operation modifies an element of the DOM, and the operation is performed within the browser context by a policy engine. The operation may, at 414, allow or disallow a function of the element, or show or hide a user interface representation of the element, when the DOM is rendered by the browser. In some examples, at 416, the operation modifies element data of an element of the DOM to redefine at least one of its content and appearance when rendered by the browser, and the operation is performed within the browser context by a policy engine. In some examples, at 418, the operation logs the document change event outside the browser. This may also include logging data associated with the event, including data of the associated element.

Figure 5:
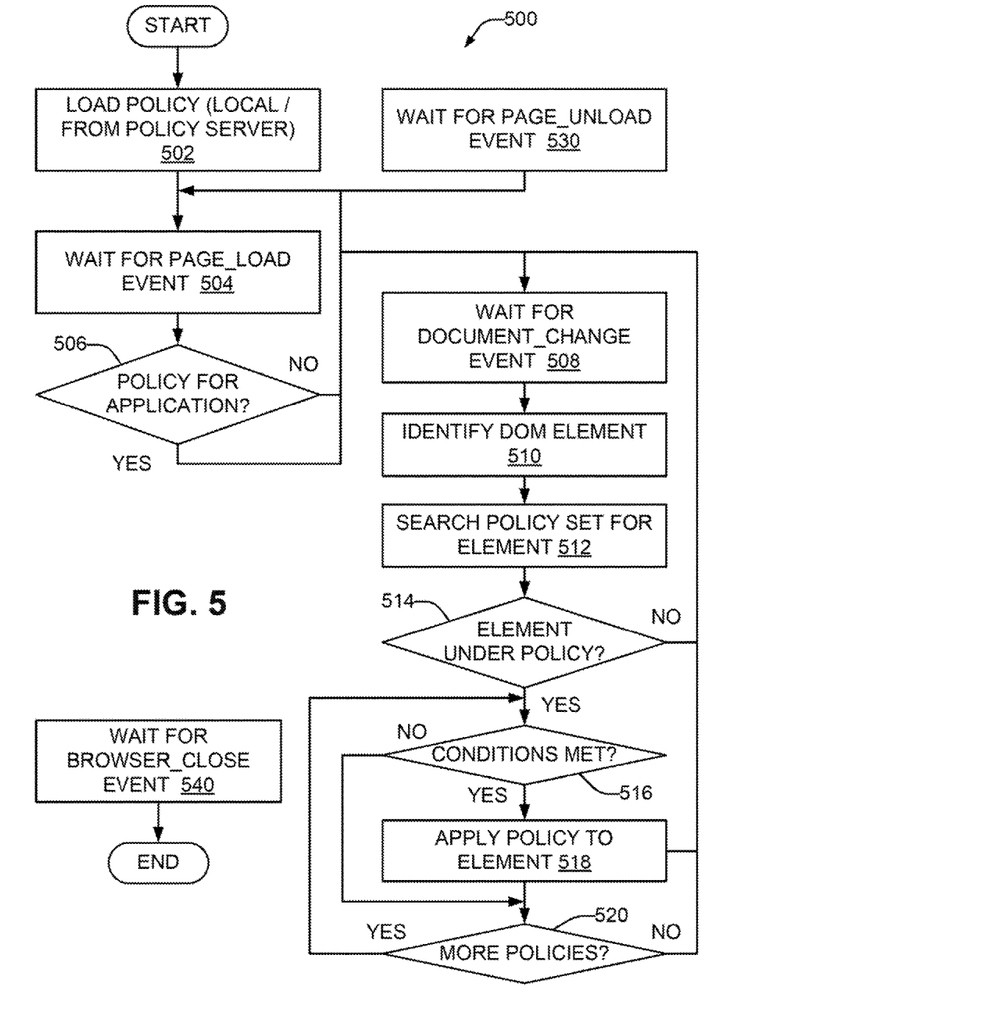
FIG. 5 is another flowchart of a method for enforcing, using a web browser of a client computer, a predefined management policy for an HTTP-based application executed on a server computer, in accordance with an example of the present disclosure.

Consider now, and with reference to FIG. 5, another method for enforcing, using a web browser of a client computer, a predefined management policy for an HTTP-based application executed on a server computer. Alternatively, FIG. 5 may be considered a flowchart of a policy engine, such as policy engine 170 (FIG. 1), 270 (FIG. 2), of a web browser of a client computer. The method begins, at 502, by loading at least one policy. In some examples, a policy dataset having multiple individual policies, such as policy dataset 292 (FIG. 2), is loaded. The loading may be done from a policy server external to the client computer, or from a local copy already on the client. At 504, the occurrence of a page load event is awaited. The page load event indicates that a new web page has been loaded, and that the DOM now represents the elements of that new web page. The page load event may occur in response to the user navigating to a new URL with the web browser. The page load event may also occur in response to the application sending a new web page to the client, which generates a new DOM. At 506, it is determined whether a policy 192 (FIGS. 1-2) exists in the policy dataset 292 for the application. This may be done by comparing the top level domain of the URL of the web page to the application field 294 of a policy 192 in the policy dataset 292. If not ("No" branch of 506), then the flow branches to 504. If so ("Yes" branch of 506), then at 508 a document change event is awaited. A document change event may be generated by the triggering engine 160 (FIGS. 1-2) for a DOM element if a change to that DOM element occurs. At 510, once a document change event is detected, the DOM element associated with the document change event is identified. The document change event provides an indication of the DOM element which has changed. At 512, the policy dataset 292 is searched for one or more policies which correspond to the changed DOM element. This may be done by comparing the DOM element indicated by the document change event with the element field 295 of each policy 192 in the policy dataset 292. If the DOM element which changed is not under policy ("No" branch of 514), then the flow branches to 508. In other words, in this case there is no policy 192 in the dataset 292 with a matching element field 295. If the DOM element which changed is under policy ("Yes" branch of 514)—in other words, that there is at least one policy 192 with a matching element field 295—then these element-matching policies 192 may be sequentially tested at 516-518. At 516 it is determined, for one of the element-matching policies 192, if the condition (or conditions) specified in that policy 192 are met. This may be determined by comparing the condition field 296 of each element-matching policy 192 with the current relevant attributes, properties, and element data of the DOM element. If the condition(s) specified for the DOM element which changed are not met ("No" branch of 516), then the flow branches to 520. If the conditions specified are met ("Yes" branch of 516), then at 518 the operation specified in the operation field 297 for that policy is performed, and flow continues at 520. At 520, it is determined if there are more element-matching policies 192 still to be tested. If so ("Yes" branch of 520), then the next element-matching policy 192 is selected and flow branches to 516. If not ("No" branch of 520), then all element-matching policies have been tested and the flow branches to 508 to await the next document change event.

The method has several points at which it waits for an event to occur, such as at 504, 508, 530, and 540. Each point is shown separately for clarify of illustration in FIG. 5, but the type of event which occurs determines where the method continues. Accordingly, if the triggering engine 160 detects a page unload event at 530, flow branches to 504. This indicates that the web page whose loading triggered the prior page load event has been unloaded, and there is no need to await document change events.

In addition, if the triggering engine 160 detects a browser close event at 540, this indicates that the web browser is being shut down. As a result, operation of the policy engine is terminated.

Figure 6A:
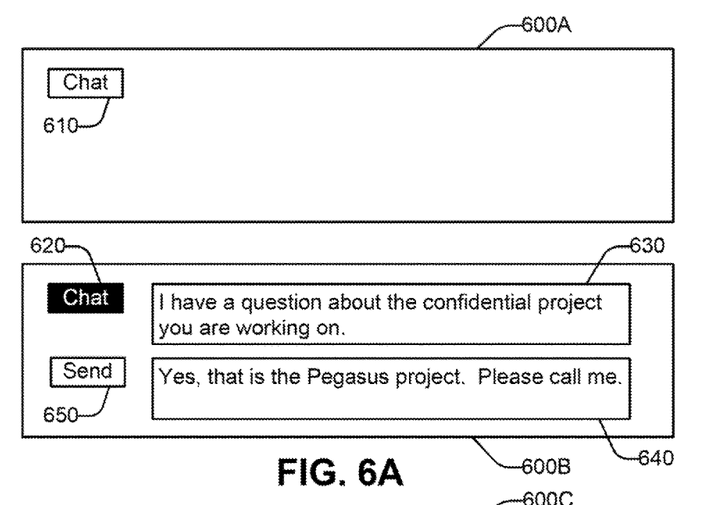
FIGS. 6A through 6C are examples of window displays of a client computer performing a method for enforcing, using a web browser of a client computer, a predefined management policy for an HTTP-based application executed on a server computer, in accordance with an example of the present disclosure.

Considering now an example of enforcing, using a web browser of a client computer, a predefined management policy for an HTTP-based application executed on a server computer, and with reference to FIG. 6A, an example application is located at the URL "http:\\www.example.com", and the user directs the web browser to this URL. For simplicity of explanation, the application provides first and second example web pages to the browser. In a first example, there is no policy applicable to the application. This can happen if the web browser has no policy engine, or if the web browser has a policy engine but there are no policies defined for the application. The first example web page, when rendered on the display by the rendering engine of the web browser, results in the graphical interface of window 600A, which includes a chat button 610. If the user selects the chat button 610, the HTTP-based application responds to this user input and provides the second example web page to the web browser. In response to receiving the second example web page, the web browser renders the second page on the display to produce the graphical interface of window 600B. The second web page includes a highlighted chat button 620, a text box 630 for incoming messages, a text box 640 for outgoing messages, and a send button 650. This is a simple illustration of a user interface in which incoming messages from a remote client with which the chat session is being conducted are displayed in the incoming message text box 630 upon receipt at the local client, and outgoing messages from the user at the local client appear in outgoing message text box 640 as they are typed by the user. When the user selects the send button 650, the outgoing message in box 640 is sent to the remote client.

Table 1 illustrates a fragmentary portion of a DOM that corresponds to the first example web page:

TABLE 1

First Example Web Page (Window 600A)

```
<html>
<head>
...
<style>
// Chat Button style properties: visible, buttoncolor=white, textcolor=black
chat_button {
    background: white;
    margin: 0;
    padding: 0;
    font-size: 10px;
    font-style: bold;
    font-family: Verdana, Arial, Helvetica, sans-serif;
    color: black;
    visibility: visible;
}
</style>
<script type="Javascript">
...
doStartChatSession( )
{
// Actions to be performed when the Chat button is selected
}
...
</script>
...
</head>
<body>
...
// Chat Button
<a class="chat_button" id="0001" role="button"
```

TABLE 1-continued

First Example Web Page (Window 600A)

```
action="doStartChatSession( );" href="/user/chat" > [Chat] </a>
...
</body>
</html>
```

Several conventions are applied for simplicity of illustration in tables illustrating the DOM, such as Table 1. First, many portions of the DOM that are not pertinent to the disclosure are omitted for clarity. Such portions are illustrated by ellipsis (" . . . ") in the tables. Seconds, all comments begin with the characters "//". Third, brackets ("[ ]") denote element data, which is also known as "inner HTML", and the element data is illustrated within the DOM element for clarity even though it may not appear in the representation of the DOM that is generated using developer tools.

In Table 1, the appearance of the chat button 610 is defined by the properties for the chat_button DOM element in the <style> section. The attributes and tags that identify the chat button 610 and define its functionality are specified in the <body> section. These include the class attribute, the id attribute, the role attribute, the action attribute, and the href attribute. The attributes and tags enable the application to implement with the server the functionality that is associated with the DOM element. The element data may be used by the application in implementing the functionality as well.

Table 2 illustrates a fragmentary portion of a DOM that corresponds to the second example web page:

TABLE 2

Second Example Web Page (Window 600B)

```
<html>
<head>
...
<style>
// Chat Button style properties: visible, button=black, text=white
chat_button {
    background: black;
    font-size: 10px;
    font-style: bold;
    font-family: Verdana, Arial, Helvetica, sans-serif;
    color:white;
    visibility: visible
}
// Incoming style properties: visible, box=white, text=black
incoming_msgs { ... }
// Outgoing style properties: visible, box=white, text=black
outgoing_msgs { ... }
// Send Button style properties: visible, button=white, text=black
Send_button {
    background:white;
    font-size: 10px;
    font-style: bold;
    font-family: Verdana, Arial, Helvetica, sans-serif;
    color:black;
    visibility: visible
}
</style>
<script type="Javascript">
...
doStartChatSession( )
{ ... // Actions to be performed when the Chat button is clicked }
...
doSendMessage( )
{ ... // Actions to be performed when the Send button is clicked }
...
</script>
...
</head>
```

TABLE 2-continued

Second Example Web Page (Window 600B)

```
<body>
...
// Chat Button
<a class="chat_button" id="0001" role="button"
action="doStartChatSession( );" href="/user/chat" > [Chat] </a>
...
// Incoming Message
<p class="incoming_mgs" id="0002" role="display box">
["I have a question about the confidential project you are working on"]
</p>
...
// Outgoing Message
<input class="outgoing_msg" id="0003" type="textbox" role="input
box">
["Yes, that is the Pegasus project. Please call me."]
...
// Send Button
<a class="send_button" id="0001" role="button"
action="doSendMessage( );" href="/user/chat" > [Send] </a>
...
</body>
</html>
```

In the DOM of Table 2 for the second web page, the style properties of the chat button 620 reflect its "inversed" appearance from the chat button 610. DOM elements have been added for the incoming message text box 630, the outgoing message text box 640, and send button 650. Each element has its properties, attributes, and element data defined in the DOM. The element data in Table 2 reflects the current state of the window 600B, with incoming and outgoing messages as shown.

Consider a first example predefined policy dataset that is to be enforced on the client for an HTTP-based application executed on a server. This dataset is illustrated in Table 3, and defines an app field 294, element field 295, condition field 296, and operation field 297 (FIG. 2) for each policy in the dataset:

TABLE 3

First Example Policy Dataset

| Application | Element | Condition | Operation |
|---|---|---|---|
| example.com | chat_button | Element visible | Remove this element |
| app2.com | . . . | . . . | . . . |

The dataset of Table 3 includes two policies. The first policy is applicable to the application at the top-level domain example.com, while the second policy is applicable to the application at the top-level domain app2.com.

To explain the operation of the first policy, consider a time after the web browser has been invoked on the client and the first policy loaded (FIG. 5, 502). The user navigates to the URL "http:\\www.example.com", and the HTTP-based application sends the first example web page (Table 1) to the web browser. The page load event 504 is detected by the triggering engine (FIG. 5, 404), and the first policy dataset is examined. Because the app field 294 of the first policy in this dataset corresponds to this URL (FIG. 5, step 506), the policy engine waits for a document change event (FIG. 5, step 508) to be received from the triggering engine. Document change events are generated for each DOM element of the web page as it is loaded. Document change events that occur for DOM elements other than chat_button may be ignored (FIG. 5, 510-514), because no policy exists for these other DOM elements. When the document change event for the chat_button element is generated, it is determined whether the condition is met (FIG. 5, 516). The chat_button element is visible, which satisfies the condition defined in condition field 296 of the first policy. As a result, the first policy is applied to the DOM element for the chat_button by performing the operation defined in the operation field 297 of the first policy, which removes the DOM element from the DOM. At this point, after the first policy of the dataset of Table 3 has been applied to the DOM, the modified version of the first example web page of Table 1 is as shown in Table 4:

TABLE 4

First Example Web Page after Policy applied (Window 600C)

```
<html>
<head>
...
<style>
// Chat Button style properties: visible, buttoncolor=white, textcolor=black
chat_button {
    background: white;
    margin: 0;
    padding: 0;
    font-size: 10px;
    font-style: bold;
    font-family: Verdana, Arial, Helvetica, sans-serif;
    color: black;
       visibility: visible
}
</style>
<script type="Javascript">
...
doStartChatSession( )
{
// Actions to be performed when the Chat button is selected
}
...
</script>
...
</head>
<body>
...
// Chat Button element has been deleted
...
</body>
</html>
```

Figure 6B:
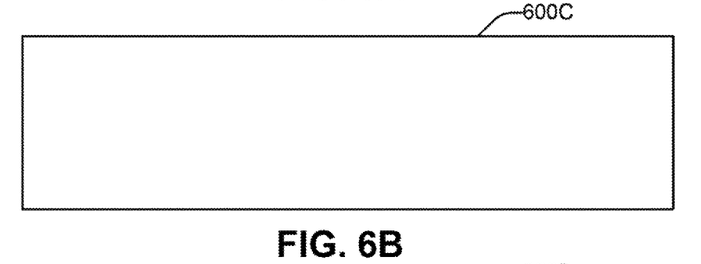

The web browser than renders the revised DOM of Table 4, resulting in the window 600C of FIG. 6B in which no chat button appears. The intent, and effect, of the policy is to prevent the user from accessing the chat function of the HTTP-based application. Other than this, however, the HTTP-based application operates normally on the client, and the application and the server are unaware of, and unaffected by, the implementation of the policy in the web browser of the client.

Consider now a second example predefined policy dataset that is to be enforced on the client for an HTTP-based application executed on a server. This dataset is illustrated in Table 5:

TABLE 5

Second Example Policy Dataset

| Application | Element | Condition | Operation |
|---|---|---|---|
| example.com | incoming_msg | Element Data substring matches "confidential" | Highlight substring in element data for this element (bold, underline, red) |
| example.com | outgoing_msg | Element Data | Redact substring with |

TABLE 5-continued

Second Example Policy Dataset

| Application | Element | Condition | Operation |
|---|---|---|---|
| example.com | outgoing_msg | substring matches "pegasus" Element Data substring matches "pegasus" | "*" in element data for this element Remove "action" attribute of send_button element to disable it, & change style properties of send_button element to "gray" |
| example.com | send_button | Element selected | Log outgoing_mgs element data |
| app2.com | . . . | . . . | . . . |

The dataset of Table 5 includes five policies. The first through fourth policies are applicable to the application at the top-level domain example.com, while the fifth policy is applicable to the application at the top-level domain app2.com.

To explain the operation of the second policy, consider a time after the second example web page (Table 2) has been loaded to the web browser and a chat session is in progress. An incoming chat message has been received from the HTTP-based application, and as the element data of the incoming_msg DOM element is changed to reflect the incoming message text, a document change event for the incoming_msg DOM element is detected. The policy engine, in processing the document change event, determines that the first policy of the policy dataset of Table 5 applies to the incoming_msg element (FIG. 5, 508-512). The element data ("I have a question about the confidential project you are working on.") is searched for the text substring "confidential", which is found. As a result, the first policy of Table 5 is applied to the DOM element for the incoming_msg element by performing the operation defined in the operation field 297 of the policy, which modifies the element data by adding tags that, when rendered, cause the substring to be displayed in a bold font, underlined, and in red. The intent, and effect, of the policy is to highlight the word "confidential" to signal the user of the client to use proper discretion in his chat session.

Next, an outgoing chat message is typed by the user of the client: "Yes, that is the Pegasus project. Please call me." Each character typed causes a document change event to the outgoing_msg element. The second and third policies of the dataset of Table 5 apply to the outgoing_msg element. For both of these policies, as per their condition fields 296, the element data is searched for the text substring "pegasus". When the user has completed typing the word, the substring specified in the condition field 296 is found. As a result, the second policy of Table 5 is applied to the DOM element for the outgoing_msg element by performing the operation defined in the operation field 297 of the second policy, redacting the characters of the substring in the element data of the outgoing_msg element with asterisks ("*"). The intent, and effect, of the second policy is to hide the project code name "pegasus" from any onlookers. Then the third policy of Table 5 is applied to the DOM element for the outgoing_msg element by performing the operation defined in the operation field 297 of the third policy, to remove the "action" attribute of the send_button element so as to disable it, and to change the style properties of the send_button element so as to give the element a grayed-out appearance. When the DOM is rendered following the changes made by the policy engine for the second and third policies, the user can recognize that he has typed a prohibited code name and cannot send his chat message until the code name has been scrubbed from the message.

At this point, after the first, second, and third policies of the dataset of Table 4 have been applied to the DOM, the modified version of the second example web page is as shown in Table 6:

TABLE 6

Second Example Web Page after Policy applied (Window 600D)

```
<html>
<head>
...
<style>
// Chat Button style properties: visible, button=black, text=white
chat_button {
    background: black;
    font-size: 10px;
    font-style: bold;
    font-family: Verdana, Arial, Helvetica, sans-serif;
    color: white;
        visibility: visible
}
// Incoming style properties: visible, box=white, text=black
incoming_msgs { ... }
// Outgoing style properties: visible, box=white, text=black
outgoing_msgs { ... }
// Send Button style properties: visible, button=gray, text=gray
Send_button {
    background: #800000;
    font-size: 10px;
    font-style: bold;
    font-family: Verdana, Arial, Helvetica, sans-serif;
    color: #800000;
        visibility: visible
}
</style>
<script type="Javascript">
...
doStartChatSession( )
{ ... // Actions to be performed when the Chat button is clicked }
...
doSendMessage( )
{ ... // Actions to be performed when the Send button is clicked }
...
</script>
...
</head>
<body>
...
// Chat Button
<a class="chat_button" id="0001" role="button"
action="doStartChatSession( );" href="/user/chat" > [Chat] </a>
...
// Incoming Message: "confidential" highlighted
<p class="incoming_msgs" id="0002" role="display box">
[" I have a question about the <font
color="red"><b><u>confidential</u></b>
</font> project you are working on"]
</p>
...
// Outgoing Message: code name redacted
<input class="outgoing_msg" id="0003" type="textbox" role="input
box">
["Yes, that is the ******* project. Please call me."]
...
// Send Button: disabled due to deletion of "action"
<a class="send_button" id="0001" role="button" action=""
href="/user/chat"
> [Send] </a>
...
</body>
</html>
```

Figure 6C:
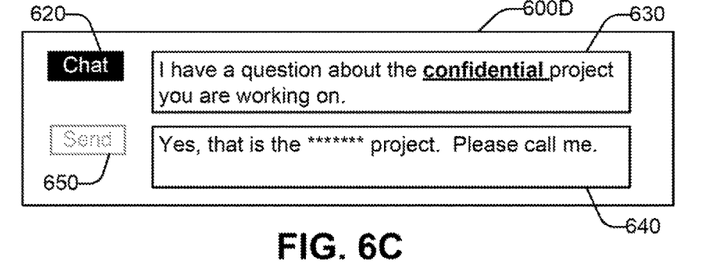

The modified DOM of Table 6, when rendered, displays the user interface of window 600D of FIG. 6C. The word "confidential" in the incoming_msg text box 630 is bolded, underlined, and in red. Asterisks replace the code name "pegasus" in the outgoing_msg text box 640. The "action" tag of the anchor (<a>) field for the send_button has been changed from action "doSendMessage( );" to action="" in order to disable the button, and the style properties for the background and color of the send button 650 are set to #800000 (gray) to visually indicate to the user that its operation is disabled and nothing will happen if the button is selected.

The example web pages and policies described with reference to Tables 1-6 and FIGS. 6A-6C, while greatly simplified, illustrate some of the capabilities provided by the present disclosure.

From the foregoing it will be appreciated that the client computer, computer-readable storage medium, and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:

1. A client computer, comprising:
   a processor; and
   a non-transitory computer-readable storage medium having executable instructions stored thereon, wherein the instructions cause the processor to implement:
      a web browser, initialized with a predefined policy, to render a document object model (DOM) for a web page received from a hyper-text transfer protocol (HTTP)-based application executed on an external server;
      a triggering engine to detect a change event for an element of the DOM;
      a policy manager to receive, from an external policy server, the predefined policy that specifies a particular HTTP-based application to which the predefined policy applies and an operation, other than rendering the DOM, associated with the change event and the element; and
      a policy engine, coupled to the triggering engine and the policy manager and executing within the web browser, to perform the operation in response to the change event, wherein the policy engine is not a script and is not part of the web page,
      wherein the policy manager configures the policy engine with the received predefined policy.

2. The computer of claim 1, wherein the web browser comprises a rendering engine to render the DOM on a display of the client computer, and wherein the policy engine is executed independently of the rendering engine.

3. The computer of claim 1, wherein the operation causes the policy engine to modify the DOM in accordance with the predefined policy.

4. The computer of claim 1, wherein the change event is responsive to an action taken by the HTTP-based application at the server computer or by a user at the client computer.

5. A non-transitory computer-readable storage medium having an executable program stored thereon, wherein the program instructs a processor of a client to:
   initialize, by the client, a web browser with a predefined management policy, the predefined management policy specifying a particular hyper-text transfer protocol (HTTP)-based application to which the predefined management policy applies, a document object model (DOM) element, a change condition indicative of a change to the DOM element, and an operation to change the DOM element if the change condition is satisfied;
   install, into the web browser of the client, a policy engine plug-in and the predefined management policy for an application executed on a server, wherein the predefined management policy is obtained from an external policy server;
   load into the web browser via HTTP and render a DOM of a web page provided by the application;
   detect with the web browser a document change event for a visible element of the DOM; and
   execute, in response to the event, the operation defined by the predefined management policy for the element without executing a script of the web page.

6. The medium of claim 5, wherein the operation logs information related to the document change event outside the web browser.

7. A method for enforcing, using a web browser of a client, a predefined management policy for a hyper-text transfer protocol (HTTP)-based application executed on a server, comprising:
   initializing, by the client, the web browser with the predefined management policy, the predefined management policy specifying:
      a particular HTTP-based application to which the predefined management policy applies,
      a first document object model (DOM) element,
      a change condition indicative of a change to a first presence, a first property, a first attribute, or a first data value of the first DOM element, and
      an operation to change a second presence, a second property, a second attribute, or a second data value of a second DOM element if the change condition is satisfied;
   receiving at the client a web page presented by the server, wherein the predefined management policy is separate from the web page and is received by the client from an external policy server;
   constructing a DOM corresponding to the web page;

detecting with the web browser a document change event for a particular element of the DOM; and in response to detecting that the application is the particular HTTP-based application, the particular element is the first DOM element, and the change condition is met, performing the operation specified by the predefined management policy for the first DOM element without executing a script in the web page so as to effect a change to the second presence, the second property, the second attribute, or the second data value of the second DOM element.

8. The method of claim 7, wherein the application and the server are unaware of the predefined management policy and the operation.

9. The method of claim 7, wherein the operation does not comprise, and is performed independently from, the constructing of the DOM.

10. The method of claim 7, wherein the operation is performed if the element is visible.

11. The method of claim 7, wherein the predefined management policy is an individual one of a dataset of policies, and wherein each policy in the dataset specifies an HTTP-based application to which the policy applies, a first DOM element in a web page for the application to which the policy applies, the operation for the second DOM element, and a condition for the first DOM element that, if satisfied, causes the operation to be performed on the second DOM element.

12. The method of claim 11, wherein the first and second DOM elements are the same element.

13. The method of claim 11, wherein the first and second DOM elements are different elements.

* * * * *